T. M. BRINTNALL.
SIDEWALK TRAP.
APPLICATION FILED AUG. 28, 1911.
1,024,059.
Patented Apr. 23, 1912.
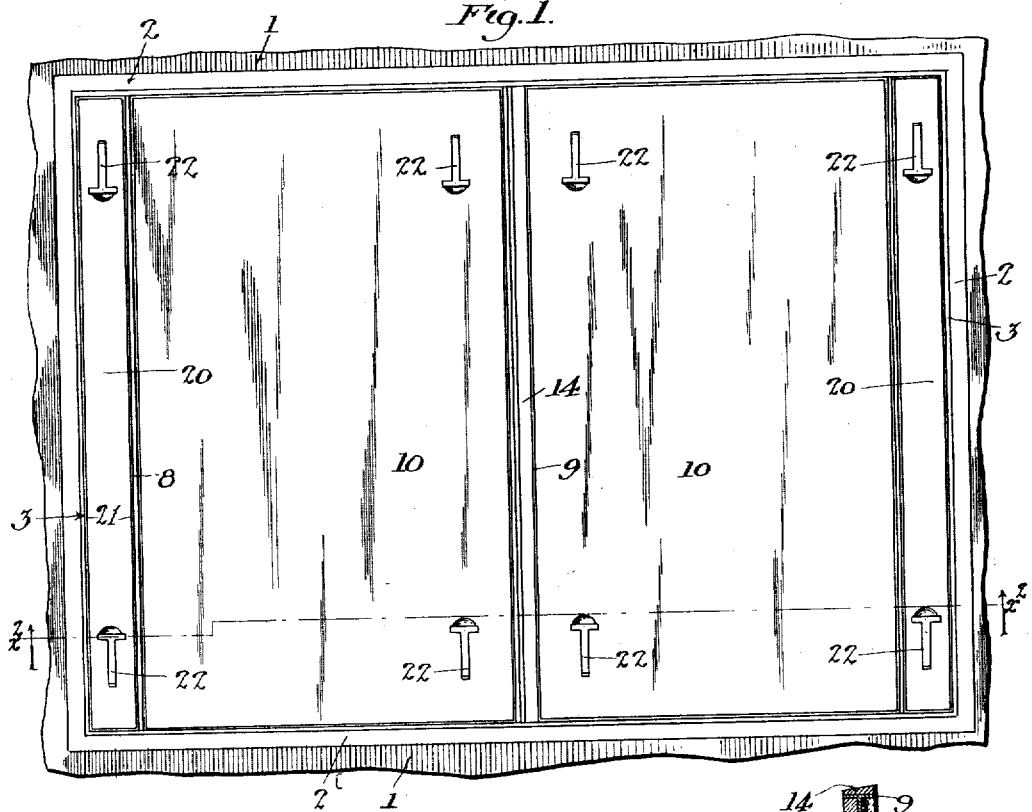
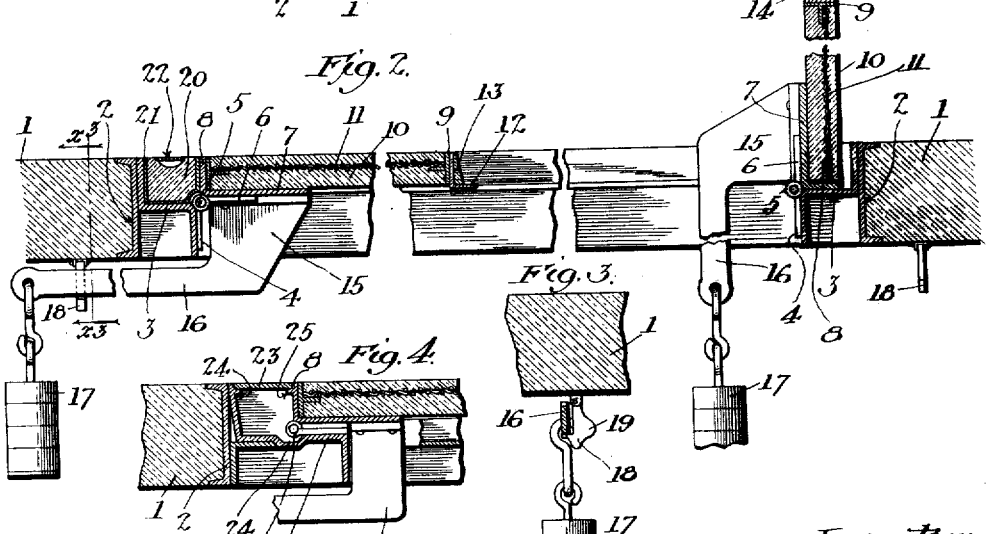
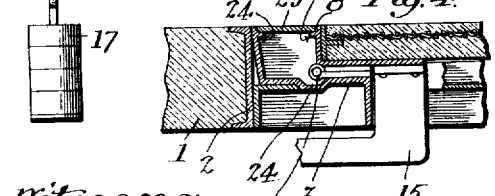
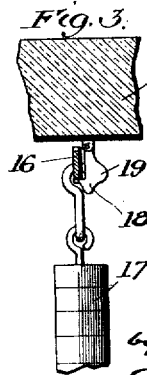
Witnesses:
Inventor:
Thomas M. Brintnall,
by Lyon & Hackley atty

UNITED STATES PATENT OFFICE.

THOMAS M. BRINTNALL, OF OAKLAND, CALIFORNIA, ASSIGNOR OF ONE-HALF TO W. D. HAMMOND, OF LOS ANGELES, CALIFORNIA.

SIDEWALK-TRAP.

1,024,059.  Specification of Letters Patent.  Patented Apr. 23, 1912.

Application filed August 28, 1911. Serial No. 646,542.

*To all whom it may concern:*

Be it known that I, THOMAS M. BRINTNALL, a citizen of the United States, residing at Oakland, in the county of Alameda and State of California, have invented a new and useful Sidewalk-Trap, of which the following is a specification.

This invention relates to sidewalk traps, and particularly to one in which the body portions of the doors are formed of concrete or other pavement material, which preferably corresponds to the material of which the sidewalk is constructed, and the hinges are concealed, the entire upper surface of the trap is flush with the sidewalk and there are no depressions, obstructions, or open seams or cracks, the entire upper surface presented being smooth, uninterrupted and of a uniform height, thus providing no impediment to traffic.

Referring to the drawings: Figure 1 is a plan view. Fig. 2 is a section on line $x^2$—$x^2$ Fig. 1, on an enlarged scale. Fig. 3 is a section on line $x^3$—$x^3$ Fig. 2. Fig. 4 is a view of the structure adjacent a hinge, similar to the view shown in Fig. 2, and illustrates a modification.

1 designates the sidewalk in which the trap is placed, the opening in the sidewalk being lined with a channel iron 2. At each end is a frame-bar 3 and secured to the lower flange of the frame-bar 3 is one leaf 4 of a hinge 5, the other leaf 6 of the hinge 5 being secured to a metal plate 7, which forms part of the trap and is provided with an upturned flange 8 at one end. A T-bar 9 extends around the four edges of that section of the trap and is secured to the plate 7 and flange 8 and forms a frame in which is supported a panel of concrete or other suitable material 10, which is reinforced by a wire net work 11. The inner bar of the frame 9 has an angle iron 12 secured thereto with a wedge-shaped piece 13 in the corner of the angle iron. The opposite trap is similarly constructed except that it has no angle iron 12, but has a wedge-shaped piece 14 secured directly to the frame 9, the taper of the wedge piece 14 being parallel to that of the piece 13, so that a tight fitting joint is secured when the trap is closed.

Secured to the plate 7 is a bracket 15 having an arm 16 from which is suspended a weight 17, and as clearly shown in Fig. 3, a pivoted hook 18 serves to engage the arm 16 when the trap is closed, the hook being weighted at 19 so that it will engage the arm 16 and hold the latter in horizontal position when the trap is closed, preventing the trap from being raised from the outside until after the hook has been disengaged.

In order to fill the space in the upper portion of the frame-bar 3 of the flange 8, I provide concrete strips 20 which are embedded in the metal tray 21 which fits within this space and makes a perfect closure and a uniform and unobstructed surface at the top of the trap. Each of the strips 20 is provided with suitable lifting devices 22 as are also the hinged panels 10.

When the hooks 18 are released, the two members of the trap may easily be swung up by means of the lifting devices 22, after the strips 20 have been removed, the counter-weights 17 substantially counterbalancing the weight of the hinged trap members, so that no great effort is required to swing them up or close them. When the hinged trap members are to be opened, the filler strips 20 are laid at one side to be replaced after the trap is closed.

In the form shown in Fig. 4, the construction is similar to the foregoing, except in the place of the filler strips 20, I provide a metal plate 23 which rests on a rib 24 formed on the frame-bar 3 and a rib 25 formed on the flange 8. The frame-bar 3 also has a central depression 24 which acts as a drain.

What I claim is:

1. A sidewalk trap, comprising two hinged members formed of cement panels, a metal frame surrounding each panel, a metal frame surrounding both panels, a hinge support at the outer edge of the metal frame on each panel and removable closures between the hinged edge of each panel and the outer frame.

2. A sidewalk trap, comprising two hinged members formed of cement panels, a metal frame surrounding each panel, a metal frame surrounding both panels, a hinge support at the outer edge of the metal frame on each panel and removable closures between the hinged edge of each panel and the outer frame, the metal frame around each panel being formed as a T-bar, a reinforcing means supported by the flange of the T-bar and embedded in the cement.

3. A sidewalk trap, comprising two hinged members formed of cement panels, a metal frame surrounding each panel, a metal frame surrounding both panels, a hinge support at the outer edge of the metal frame on each panel and removable closures between the hinged edge of each panel and the outer frame, the outer edge of one of said panel frames having a flange and a wedge-shaped piece on the flange, the frame member of the other panel having a wedge-shaped piece on its edge, adapted to rest against the first named wedge-shaped piece to form a tight joint when the trap is closed.

4. A sidewalk trap, comprising two hinged members formed of cement panels, a metal frame surrounding each panel, a metal frame surrounding both panels, a hinge support at the outer edge of the metal frame on each panel and removable closures between the hinged edge of each panel and the outer frame, the metal frame around each panel being formed as a T-bar, a reinforcing means supported by the flange of the T-bar and embedded in the cement, a plate supporting the outer edge of each panel and having a vertical flange, said hinge means being secured to said plate, a bracket secured to said plate, an arm carried by said bracket extending over the hinge means in a direction opposite to the panel and a weight carried by said arm.

5. A sidewalk trap, comprising two cement concrete panels, a metal frame around the opening in the sidewalk, a frame-bar along the outer edge of each panel, hinge means between each frame-bar and the associated panel and below the upper surface of the panel, and removable filler means at the hinged edge of each panel and flush with the upper surface of the panels.

In testimony whereof, I have hereunto set my hand at Los Angeles California this 22 day of August, 1911.

THOMAS M. BRINTNALL.

In presence of—
G. P. HACKLEY,
GLADYS RUSSELL.

---

Copies of this patent may be obtained for five cents each, by addressing the "Commissioner of Patents, Washington, D. C."